(12) United States Patent
Griffin

(10) Patent No.: US 7,659,694 B2
(45) Date of Patent: Feb. 9, 2010

(54) SELF-ALIGNING TERMINAL BLOCK FOR BATTERY PACK

(75) Inventor: Paul W Griffin, Pleasant Prairie, WI (US)

(73) Assignee: Snap-On Incorporated, Kenosha, WI (US)

( * ) Notice: Subject to any disclaimer, the term of this patent is extended or adjusted under 35 U.S.C. 154(b) by 0 days.

(21) Appl. No.: 11/537,897

(22) Filed: Oct. 2, 2006

(65) Prior Publication Data

US 2008/0084181 A1   Apr. 10, 2008

(51) Int. Cl.
*H02J 7/00* (2006.01)

(52) U.S. Cl. .................................. 320/114; 320/112

(58) Field of Classification Search ............. 320/106, 320/107, 111, 112, 114; 307/64, 66, 150, 307/151, 152, 153, 154, 155; 429/97, 98, 429/99, 100, 139; 439/500
See application file for complete search history.

(56) References Cited

U.S. PATENT DOCUMENTS

| | | | |
|---|---|---|---|
| 5,296,314 A | 3/1994 | Millauer et al. | |
| 5,368,954 A | 11/1994 | Bruns | |
| 5,441,828 A | 8/1995 | Akazawa | |
| 5,553,675 A | 9/1996 | Pitzen et al. | |
| 5,607,319 A * | 3/1997 | Wakata et al. | 439/341 |
| 5,671,815 A | 9/1997 | Kabatnik et al. | |
| 5,769,657 A | 6/1998 | Kondo et al. | |
| 5,792,573 A | 8/1998 | Pitzen et al. | |
| 6,057,608 A | 5/2000 | Bailey, Jr. et al. | |
| 6,247,962 B1 * | 6/2001 | DeSorbo | 439/500 |
| 6,319,053 B1 | 11/2001 | Andrews et al. | |
| 6,329,788 B1 * | 12/2001 | Bailey et al. | 320/114 |
| 6,350,149 B1 | 2/2002 | Nakane | |
| 6,554,640 B1 | 4/2003 | Koike et al. | |
| D481,672 S | 11/2003 | Niwa et al. | |
| 6,656,626 B1 | 12/2003 | Mooty et al. | |
| D494,130 S | 8/2004 | Johnson et al. | |
| D501,823 S | 2/2005 | Johnson et al. | |
| 6,921,285 B2 | 7/2005 | Glauning | |
| 6,932,660 B2 | 8/2005 | Roepke | |
| 2002/0189831 A1 | 12/2002 | Carrier | |
| 2003/0117108 A1 * | 6/2003 | Watson et al. | 320/114 |
| 2005/0142928 A1 | 6/2005 | Ono | |

* cited by examiner

*Primary Examiner*—Edward Tso
*Assistant Examiner*—M'Baye Diao
(74) *Attorney, Agent, or Firm*—Barnes & Thornburg LLP

(57) ABSTRACT

A self-aligning terminal block in a tool terminal assembly having electrical contacts for connecting to a removable battery pack to be used in conjunction with hand-held power tools having a rechargeable battery. The electrical contacts of the terminal block are preferably female terminals with two resilient guideways that taper away from each other at distal ends, preferably forming an enlarged entry area to help receive and align the battery terminals as they are inserted into narrow sections of the female terminals. The guideways can be aligned with battery terminal blades functioning as electrical contacts of the battery pack. The self-aligning terminal block has clearance on at least one side to allow lateral movement within the tool body to keep constant contact with mating electrical contacts of the terminal block and the battery pack.

5 Claims, 3 Drawing Sheets

SELF-ALIGNING TERMINAL BLOCK FOR BATTERY PACK

FIELD OF INVENTION

This invention relates to portable cordless power tools with removable batteries, and specifically to a self-aligning terminal block for use with a battery pack that provides electricity to such tools.

BACKGROUND

Certain power tools are made to be portable with removable batteries to allow for recharging. A battery pack is attached to the power tool to provide power for operation of the tool. Power tools are known having shoe batteries with horizontal slide-in locking features.

The prior art includes hand-held power tools with releasably mountable battery units for providing electrical current. The battery unit can have contact surfaces that align with contacts connected to the motor. Electrical coupling of drive motors with removable battery units can be made by pedestal connections and horizontal slide-in shoe connections.

One of the problems that occurs with power tools having removable battery packs is that the tool terminals may not properly align with the battery terminals. Misalignment of these terminals may produce a faulty or missing connection. Rigid mounting of these connections may result in damage to the connection. It would be undesirable to provide a tool that results in a faulty or damaged connection, such that it might require repair or failure of the tool.

U.S. Pat. No. 5,792,573 discloses a rechargeable battery with an adjustable contact. It discloses a floating battery terminal assembly.

U.S. Pat. No. 5,671,815 discloses a hand machine tool with a battery operated drive motor that has a plug coupling for electrical contacting of the drive motor with the battery unit mounted on the hand machine tool. The coupling includes a base provided at the machine side and displaceable relative to a machine housing. The base has contact springs that are in contact with contact surfaces provided on a plug housing of the battery unit. A centering element is located between the base and the plug housing and provides a fitting abutment between the contact springs and the contact surfaces. The base is displaceable within a certain limit.

In this regard, alignable battery terminal or contacts are generally less expensive to make, adjust or repair than the electrical connectors on the base of the tool.

It is also desirable to have alignable battery terminals or contacts than connect to a floating terminal block in the tool.

SUMMARY OF THE DISCLOSURE

The present construction is in contrast to the prior art that used tight or intolerant component assemblies to connect the terminals to the batteries. These prior art devices sometimes fail due to misalignment or vibration. The floating design helps to guarantee consistent electrical connections regardless of variations in the alignment of the tool terminals and the battery terminals or vibration from operating the tool. Also, the design should result in less breakage of terminal components.

The disclosure includes a hand-held power tool having a rechargeable battery in a removable battery pack that connects (i.e. slides) onto a tool body to electrically connect to a tool terminal assembly in the tool body. The tool includes a self-aligning terminal block having electrical contacts in the tool terminal assembly, wherein electrical contacts of the terminal block are female terminals with resilient guideways that taper away from each other at distal ends, preferably forming an enlarged entry area to help receive and align the battery terminal blades as the blades are inserted into narrow sections of the female terminals, so that the guideways can be aligned with battery terminal blades functioning as electrical contacts of the battery pack. The self-aligning terminal block has clearance on at least one side, preferably two or four, to allow lateral movement within the tool body to keep constant contact with mating electrical contacts of the terminal block and the battery pack.

BRIEF DESCRIPTION OF DRAWINGS

The present disclosure will be described hereafter with reference to the attached drawings, which are given as a non-limiting example only, in which.

Figure 1:
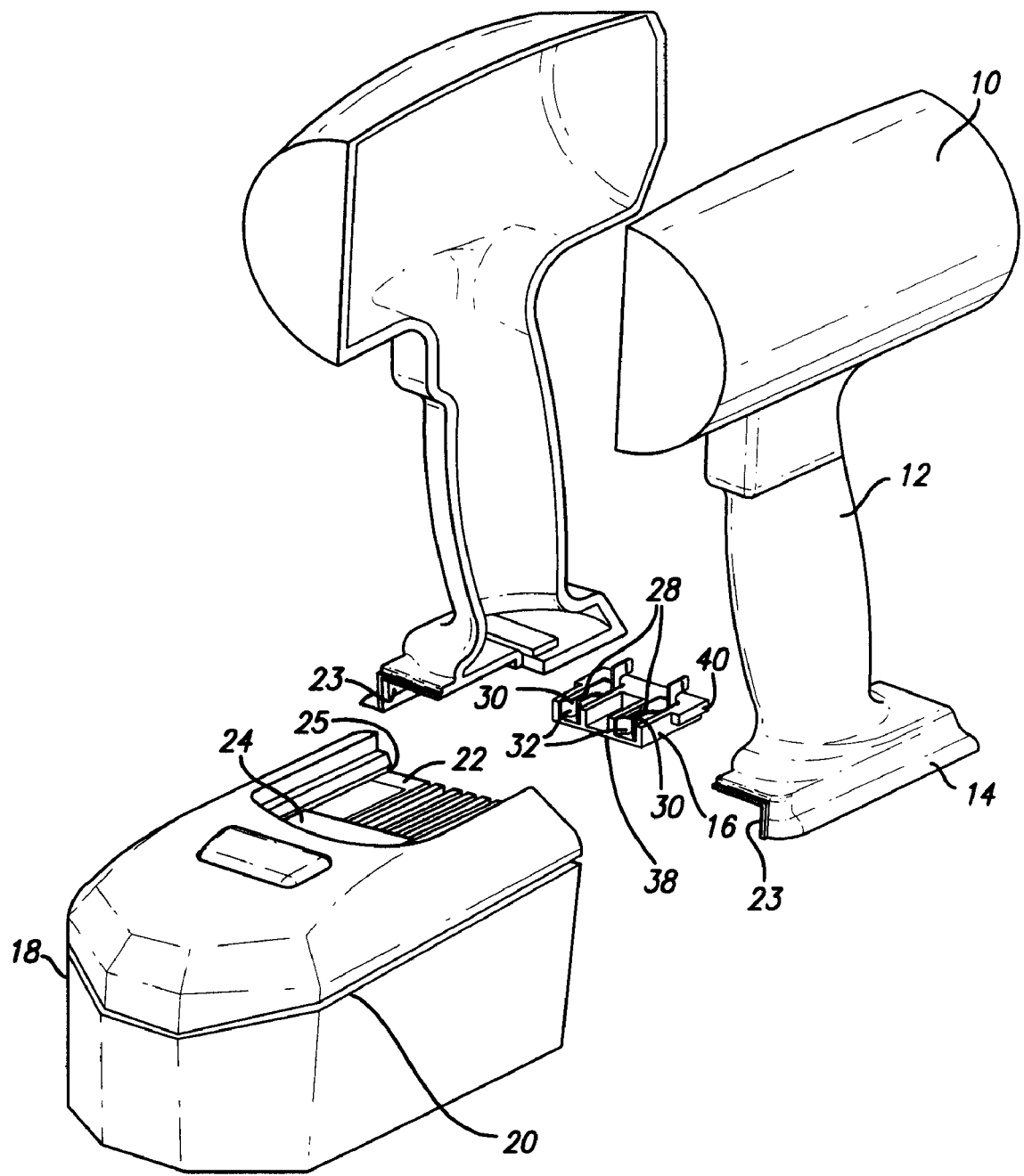
FIG. 1 shows an exploded tool body, a tool terminal assembly and a battery pack.
Figure 2:
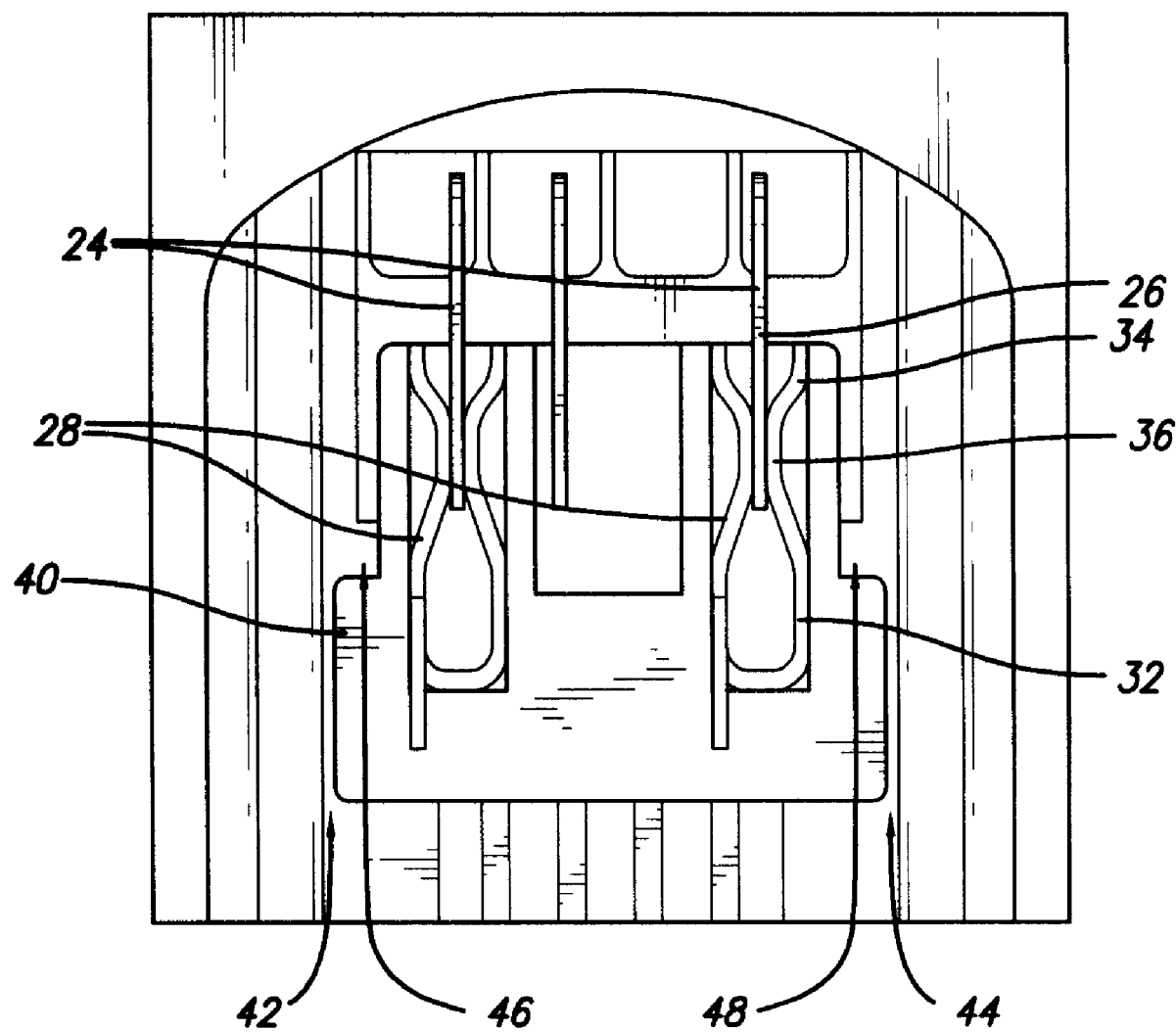
FIG. 2 is a cut-away top view of battery terminal connected to a tool terminal assembly.
Figure 3:
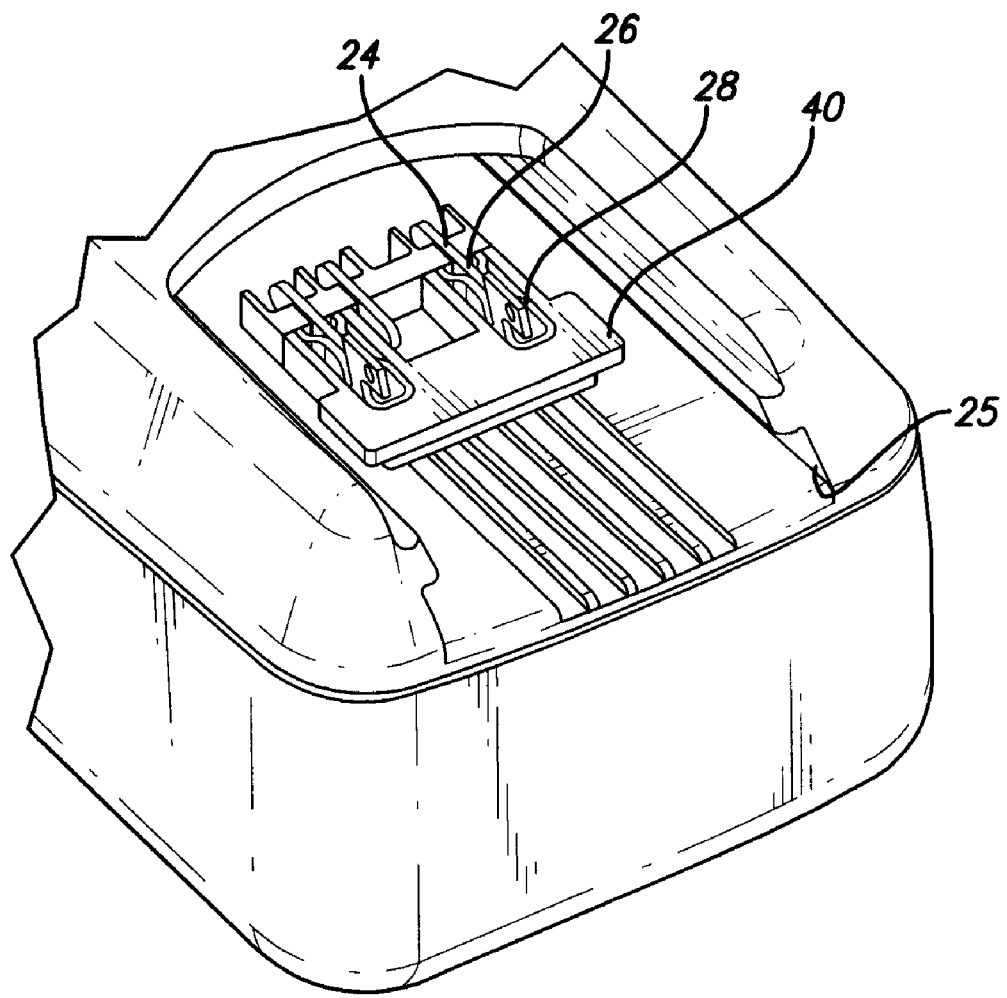
FIG. 3 is a cut-away partial perspective view of battery terminal connected to a tool terminal assembly.

The exemplification set out herein illustrates embodiments of the disclosure that is not to be construed as limiting the scope of the disclosure in any manner. Additional features of the present disclosure will become apparent to those skilled in the art upon consideration of the following detailed description of illustrative embodiments exemplifying the best mode of carrying out the disclosure as presently perceived.

DETAILED DESCRIPTION OF THE PREFERRED EMBODIMENT

While the present disclosure may be susceptible to embodiment in different forms, there is shown in the drawings, and herein will be described in detail, embodiments with the understanding that the present description is to be considered an exemplification of the principles of the disclosure and is not intended to be exhaustive or to limit the disclosure to the details of construction and the arrangements of components set forth in the following description or illustrated in the drawings.

FIG. 1 shows an exploded cordless hand-held power tool 10 having a tool body 12 including a pedestal base 14, a tool terminal assembly 16 and a battery pack 18 including a rechargeable battery 20 (not shown inside battery pack) and a shoe 22 for slideably receiving the pedestal base 14. A typical tool would also have a drive motor and other components to accomplish the specific operation of the tool. The battery pack 18 is removable and slides into a tool body 12 to electrically connect to the tool terminal assembly 16 in the tool body 12. The tool terminal assembly 16 is mounted in the base, i.e. the pedestal base 14, of the tool body 12 for engagement with the attachment shoe 22 of a battery pack 18. In a preferred embodiment, the pedestal base 14 has grooves 23 that can slide horizontally into corresponding recesses 25 on each side of the shoe 22 so that the battery pack 18 is below the tool body 12 during operation.

The shoe 22 includes battery terminal 24, which preferably consists of two parallel blades 26 that function as electrical contacts. The battery terminal 24 engages the tool terminal assembly 16 when the pedestal base 14 slides into shoe 22. In the preferred embodiment with grooves 23, the pedestal base 14 slides horizontally into corresponding recesses 25 in the shoe 22, so that the battery terminal 24 engages the tool terminal assembly 16 in the direction of insertion.

The tool terminal assembly 16 includes tool terminal 28, which is a pronged or fingered type of terminal, which receives the blades 26 of the battery terminals 24 there between. Preferably, the tool terminal 28 consists of two female terminals 30 that function as electrical contacts. Each female terminal 30 has two resilient guideways 32 that can slightly flex away from each other. The distal ends 34 of the two guideways taper away from each other to form an enlarged entry area to help receive and align each blade 26 as it is inserted into the narrow section 36 of the tool terminals 28. The narrow section 36 of the tool terminals 28 are formed or sprung in a configuration such that the narrow section 36 of each guideway 32 engages the blades 26 of the battery terminals 24. The narrow sections 36 are preferably close together to be more narrow than blade 26 to secure the blade 26 after the blade forcibly expands the two resilient guideways 32 when the blade 26 are inserted. The female terminals 30 can be aligned with battery terminal blades 26 functioning as electrical contacts of the battery pack 18. It is possible to reverse this configuration such that the prongs are on the battery and the blades are on the tool.

Figure 4:
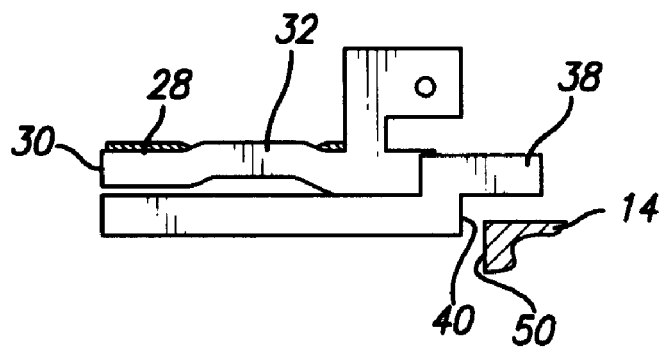
FIG. 4 is a side view of the tool terminal assembly.

The tool terminal assembly 16 further includes a self-aligning terminal block 38 having electrical contacts as part of female terminals 30. The female terminals 30 are mounted on the block 38. The terminal block 38 has some degree of play as it is retained in the tool 10. This movement, typically shown as side to side movement, allows the tool terminals 28 to keep constant contact with the mated battery terminals 24. The self-aligning terminal block 38 has clearance on at least one side 42 and preferably two sides 42 and 44, and possibly four sides 42, 44, 46, and 48, to allow lateral movement within the pedestal base 14 of the tool body 12 to keep constant contact with mating electrical contacts of the terminal block 38 and the battery pack 18. As shown in FIG. 4, the terminal block may have a rim 40 perpendicular to the insertion direction to put a limit on lateral movement in the insertion direction when it contacts a corresponding lip 50 formed as part of the pedestal base 14.

The figures show a floating terminal block 38 with electrical contacts for easy alignment with the electrical contacts of the battery pack 18. The self-aligning terminal block 38 has a floating aspect that accommodates vibrations and slightly off alignment while allowing good electrical conduction by maintaining electrical contact between the tool 10 and rechargeable battery 20. The lateral movement allows for accurate aligning. The floating terminal block 38 is useful to allow adjustment resulting from variations in manufacturing tolerances as well as vibration resulting from tool operation.

While this disclosure has been described as having an exemplary embodiment, this application is intended to cover any variations, uses, or adaptations using its general principles. It is envisioned that those skilled in the art may devise various modifications and equivalents without departing from the spirit and scope of the disclosure as recited in the following claims. Further, this application is intended to cover such departures from the present disclosure as come within the known or customary practice within the art to which it pertains.

I claim:

1. A hand-held power tool adapted for use with a rechargeable battery in a removable battery pack for controllable releasable connection to a tool body to electrically connect to a tool terminal assembly in the tool body, the tool comprising a self-aligning terminal block having electrical contacts in the tool terminal assembly, wherein electrical contacts of the terminal block are female terminals with resilient guideways that taper away from each other at distal ends that can be aligned with battery terminal blades functioning as electrical contacts of the battery pack, a portion of at least one side of the self-aligning terminal block defining a clearance to allow some degree of lateral side to side movement within the tool body to keep constant contact with mating electrical contacts of the terminal block and the battery pack.

2. The power tool of claim 1 wherein the self-aligning terminal block has areas defining clearance on four sides.

3. The power tool of claim 1 wherein the guideways taper away from each other to form an enlarged entry area to help receive and align the battery terminal blades as the blades are inserted into narrow sections of the female terminals, wherein each narrow section is formed closely together to be more narrow than the blades so both guideways engage the respective blade of the battery terminal.

4. The power tool of claim 1 wherein the terminal block has a rim capable of engaging a corresponding lip formed as a part of the tool body.

5. A hand-held cordless, power tool including a rechargeable battery in a removable battery pack that slidably inserts onto and below a pedestal base of a tool body to electrically connect to a tool terminal assembly in the tool body with an insertion direction generally horizontal with respect to operation of the tool, the tool comprising a self-aligning terminal block having electrical contacts in the tool terminal assembly, wherein electrical contacts of the terminal block are female terminals with two resilient guideways that taper away from each other at distal ends to form an enlarged entry area, the two resilient guideways can be aligned in the insertion direction with battery terminal blades functioning as electrical contacts of the battery pack, a portion of at least one side of the self-aligning terminal block defining a clearance on at least one side to allow some degree of lateral side to side movement within the tool body to keep constant contact with mating electrical contacts of the terminal block and the battery pack, wherein the terminal block has a rim that is perpendicular to the insertion direction to function as a limit on lateral movement in the insertion direction when the rim engages a corresponding lip formed as a part of the pedestal base.

* * * * *